United States Patent

Van Der Giessen et al.

[11] Patent Number: 6,084,139
[45] Date of Patent: Jul. 4, 2000

[54] METHOD FOR PROCESSING WASTE OR BIOMASS MATERIAL

[75] Inventors: Abraham Barend Van Der Giessen, Numansdorp; Jacob Hendrik Obbo Hazewinkel, Zoetermeer, both of Netherlands; Klaus Jungk, Keulen, Germany; Jan Pieter Lotens, Apeldoorn; Ruurd Andries Van Der Veen, Haren, both of Netherlands

[73] Assignee: Gibros Pec B.V., Netherlands

[21] Appl. No.: 09/205,228

[22] Filed: Dec. 4, 1998

[30] Foreign Application Priority Data

Dec. 5, 1997 [NL] Netherlands ............ 1007710

[51] Int. Cl.$^7$ ...................................... C07C 1/00
[52] U.S. Cl. ............... 585/240; 585/241; 201/2.5; 201/25
[58] Field of Search .................. 585/240, 241; 201/2.5, 25

[56] References Cited

U.S. PATENT DOCUMENTS

| | | | |
|---|---|---|---|
| 4,541,345 | 9/1985 | Grumpelt et al. | 110/229 |
| 4,822,935 | 4/1989 | Scott | 585/240 |
| 5,672,794 | 9/1997 | Northemann | 585/241 |
| 5,711,924 | 1/1998 | Kiss | 423/240 R |
| 5,731,483 | 3/1998 | Stabel et al. | 585/241 |
| 5,849,964 | 12/1998 | Holighaus et al. | 585/241 |

FOREIGN PATENT DOCUMENTS

| | | |
|---|---|---|
| 120 397 | 10/1984 | European Pat. Off. |
| 563 777 | 10/1993 | European Pat. Off. |
| 726 307 | 8/1996 | European Pat. Off. |
| 43 27 320 | 3/1994 | Germany |
| 44 46 803 | 6/1996 | Germany |

*Primary Examiner*—Bekir L. Yildirim
*Attorney, Agent, or Firm*—Sughrue, Mion, Zinn, Macpeak & Seas, PLLC

[57] ABSTRACT

The invention relates to a method for processing waste or biomass material into valuable products such as, for example, combustible gases, which is characterized in that (a) the waste or biomass material is subjected to a pyrolysis at a temperature of 350–650° C., advantageously 450–550° C.;

(b) the gas released in the course of the pyrolysis is subjected—without condensation—to a cracking treatment at a temperature of 1100–1600° C., advantageously 1200–1400° C., under the influence of oxygen-rich gas introduced from outside and possibly of steam;

(c) the residue liberated in the course of the pyrolysis is gasified under a pressure of 0.5–1.5 bar, advantageously 0.8–1.2 bar, at a temperature of 1200–1700° C., advantageously 1400–1600° C., and is volatilized or, as the case may be, fused under reducing conditions;

(d) the fused slag or metal concentrate obtained under stage (c) is discharged or, as the case may be, recovered;

(e) the product gases obtained in the course of stages (b) and (c) are combined or not combined and then subjected to gas cleaning.

15 Claims, 1 Drawing Sheet

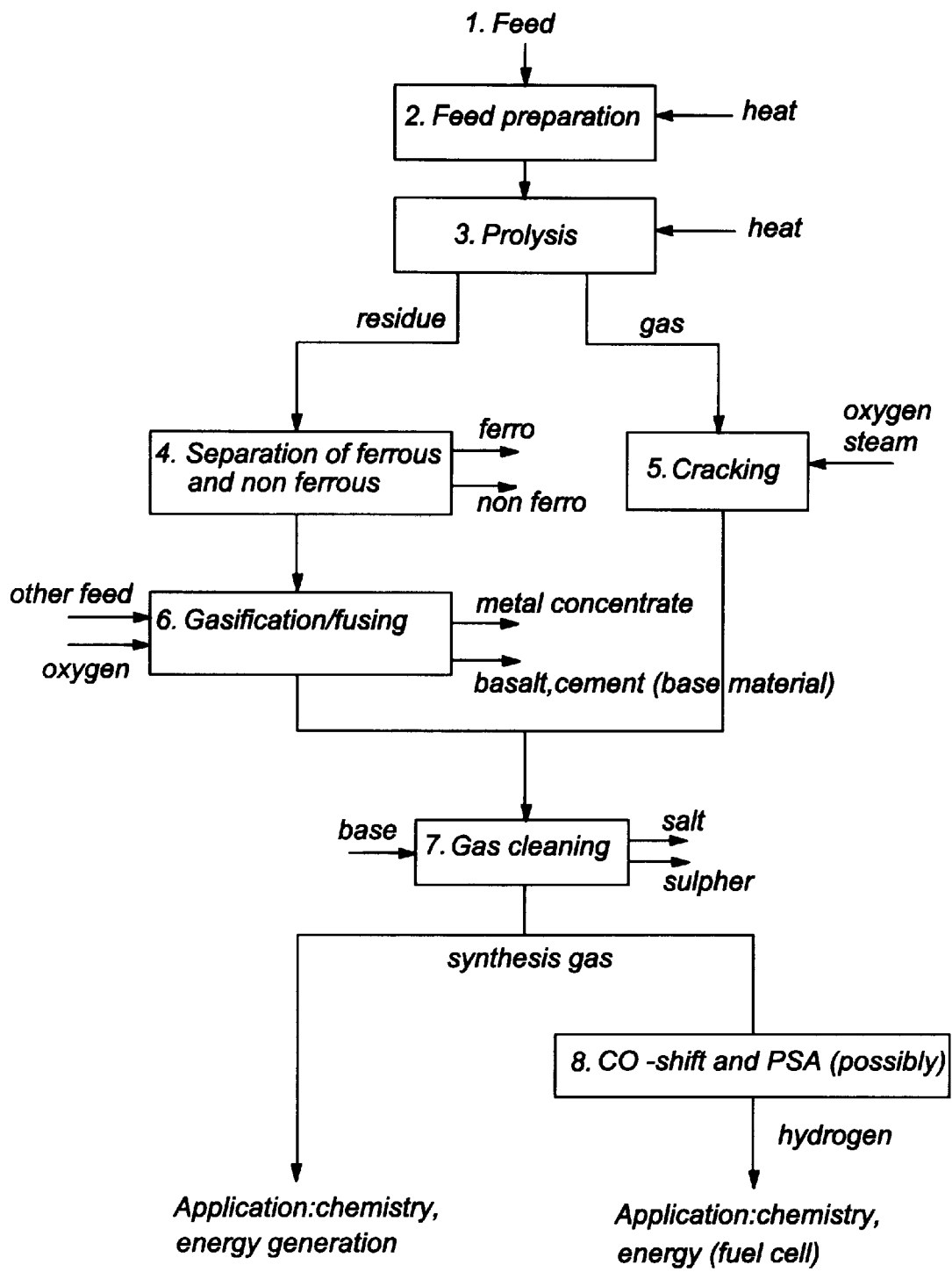

METHOD FOR PROCESSING WASTE OR BIOMASS MATERIAL

The invention relates to a method for processing waste or biomass material into valuable products such as, for example, combustible gases.

Such a method is known from the prior art. More particularly, EP-302 310 B1 relates to an apparatus for thermal processing of waste comprising (a) a pyrolysis reactor, in which the waste is converted, between 300 and 600° C., into pyrolysis gas and pyrolysis residue;

(b) a discharge facility for these pyrolysis products, which is linked to said pyrolysis reactor;

(c) a combustion chamber, connected to the pyrolysis-gas side of said discharge facility, for the pyrolysis gas; and (d) a separation facility connected to the pyrolysis-residue side of said discharge facility, which is characterized in that the combustion chamber, which is suitable for use above 1200° C., provides for thermal decomposition of the organic substances in the pyrolysis gas and has an offtake for the fused and, after cooling, vitrified slags and in that the pyrolysis-residue separation facility separates the residue into coarse and finer particles, the finer particles, which are still combustible, being ground and then being combusted in the combustion chamber and the coarser particles, which are incombustible or virtually incombustible, being separated off. Combustion of the finer pyrolysis-residue fractions, which are combusted together with the pyrolysis gas in the abovementioned combustion chamber, gives rise to the formation of flue gas and slags, with the option of the flue dust in the discharged flue gas being recycled to the combustion chamber in order to be fused into the slag. Using this method according to EP 0 302 310 B1 prevents any de novo synthesis of dioxins and the like, since the gas in the combustion chamber is heated at 1200° C. Recycling the flue dust to the combustion chamber may possibly give rise to problems, since the concentrations of this in the slag become fairly high and the incorporation of, for example, cadmium and mercury into the slag as such is a problem. Moreover, this known method has a low efficiency, since all the combustible products undergo immediate post combustion. As well as electricity, a great deal of heat is produced in the process, and utilization of the heat depends largely on whether it can be usefully employed in situ. At the same time, the melt is quenched immediately, which does not favour thorough mixing thereof and results in the slag properties not being readily adjustable. Furthermore, fusion is carried out under oxidizing conditions, so that only small amounts of metals volatilize and the melt therefore retains a fairly high impurity level. At the same time, no sulphur can be obtained in the course of gas cleaning, since the sulphur is present as $SO_x$, rather than as $H_2S$, as is the case with fusion under reducing conditions. Finally, the gas cleaning apparatus needs to be designed for a large gas volume, since the combustion is carried out using air.

EP-545 241 A1 describes a method for processing waste materials, in which the waste materials are pyrolyzed in a pyrolysis oven up to about 800° C. The pyrolysis gas is separated from the pyrolysis residue at a temperature above the condensation temperature of the hydrocarbons. Then the pyrolysis residue is subjected to classifying and size-reduction stages and separated according to size, the coarse material obtained, which mainly consists of metals, being discharged. The fine fraction also obtained, which is enriched with carbon gaseous material, is supplied, together with the pyrolysis gas and possibly additional fuel and also oxygen as a gasifying agent, to a gasification reactor in which a temperature above the melting point of the mineral material present is reached and a liquid slag is formed as a consequence. Examples of waste materials which may be mentioned include: domestic rubbish, plastic waste, oil-containing waste material and shredder material. The products obtained with this method implemented autothermally are a synthesis gas, freed from sulphur compounds, hydrogen halides and aerosols via gas cleaning, a readily dumpable slag, sulphur and metals. A drawback of this method, however, is that the gasifier requires a fine feed, which means that high standards are set for the grinding of the solids. In addition, the high pressure employed leads to costlier equipment and higher safety requirements. Regarding the melt, it is noted that this method, too, involves immediate quenching of the melt, so that it is not thoroughly fused and the product characteristics of the slag are not readily adjustable. Furthermore, the volatilized metals, together with the slag, end up in a water phase from which they can be isolated separately only with difficulty.

EP-443 596 B2 discloses a method for the pyrolysis of organic materials such as domestic rubbish, industrial waste and the like, which involves the material to be pyrolyzed being introduced, after compaction, into a heatable pyrolysis chamber and moving through said chamber in compacted form, the heat being supplied via the contact of the material with the walls and the gaseous pyrolysis products formed being discharged under elevated pressure. The pyrolysis temperature employed with this method is 250–500° C. This method further involves the addition of additives to the primary feed so that it is possible to adjust the eventual slag composition. However, the metals present in the waste are smelted as a mixed alloy and are then less readily utilizable. Moreover, the steps in this known method are not independent, which means that drying becomes inefficient since no waste heat can be used for this purpose and it becomes very difficult for inorganic waste to be fed separately to the gasifier/melt phase. Since, at the same time, the heat transfer needs to take place via contact with the wall, the heat transfer to the unsorted waste will be fairly irregular, as a result of which operation of such an apparatus will be by no mears unproblematic.

WO 95/21903 describes a method for preparing fuel gas from organic materials, in particular water-containing waste materials such as, inter alia, bituminous coal, sludges, domestic and industrial waste, wood and other biomass, said method taking place via known process steps such as drying, pyrolysis and gasification. This method is characterized in that, in a first step under a pressure of 1–50 bar, the material is dried in a first (in)direct heating stage and is pyrolyzed between 350–500° C., pyrolysis gas on the one hand and coke with inorganic material on the other hand being obtained in the process. In a second step, the pyrolysis gas is combusted, at a temperature above the melting temperature of the inorganic fraction, with air and/or oxygen-containing waste gases between 1200 and 2000° C. with the separation of a melt. In a third stage, the flue gas from the second stage is then converted into a gasification gas and the temperature is brought to between 800 and 900° C., when the pyrolysis residue from the first step, either finely ground or not finely ground, is injected into the gas at 1200–2000° C., the carbon dioxide being partially converted into carbon monoxide and the water being partially converted into hydrogen. In the fourth step of this known method, the product gas from the third step is cooled and cleaned and the carbonaceous fraction liberated in the process is recycled to the second step.

With this known method, coarse fractions such as, for example, coarse fractions of metals, are separated from the pyrolysis residue via screening. The remaining fine material is ground prior to the gasification carried out in the third stage. Implementation of such a method is regarded as fairly complex, however, and requires a novel design.

Further, EP-653 478 A1 relates to a method for thermal processing of waste material such as domestic rubbish, industrial waste, old tyres, plastic waste and sewage sludge, which involves, in a first thermal step, pyrolysis of the waste in a rotary furnace and further thermal treatment of some of the products thus produced. This known method is characterized in that the pyrolysis is carried out in cocurrent operation in a directly heated rotary kiln which contains a bed of fine particles of recycled pyrolysis residue and in that the pyrolysis gas is combusted in an afterburner. The pyrolysis residue undergoes mechanical treatment which involves part of it being recycled to the rotary kiln and the remainder being converted into synthesis gas in a cyclone with the aid of pure oxygen. The liquid slag which comes from the cyclone and which, after cooling, inter alia incorporates heavy metals in storage-stable form, can be used, for example, to prepare rock wool. With this method, however, the pyrolysis gas is combusted directly and therefore not utilized optimally. Moreover, carrying out the pyrolysis is somewhat complicated, since some of the pyrolysis residue is recycled.

EP-704 518 A1 relates to a method for thermal utilization of waste materials containing inorganic and organic components, such as domestic rubbish or sewage sludge, which involves pyrolysis of the waste in a rotary kiln, whereafter the pyrolysis residue after mechanical separation is reacted, in a gasifier cyclone, with oxygen at temperatures of more than 1400° C. to produce: synthesis gas, the pyrolysis gas being passed directly, while hot, into said gasifier cyclone. The two pyrolysis products together are therefore gasified and fused in a subsequent step, which results in a less flexible process.

WO 96/29542 discloses a method for treating domestic rubbish, wherein a) the waste material is pyrolyzed, b) the pyrolysis gas is dedusted, a portion of the pyrolysis gas obtained is combusted and the remainder is passed into a smelting furnace, c) the hot gas from the combustion is used to heat the pyrolysis reactor, and d) the waste gas from the heating of the pyrolysis reactor and the pyrolysis residue are passed into the smelting furnace. The pyrolysis residue is stripped of metals and ground to a size of less than 50 mm before being fed to the smelting furnace. Flue gases on the one hand and non-leachable slags on the other hand are generated from said smelting furnace, which is operated using externally supplied air at 1250–1500° C. An important drawback of this method is the total combustion of the organic constituents in the waste material, which does not result in optimum utilization of the energy content thereof and in any case is strongly location-dependent. Furthermore, smelting takes place under oxidizing conditions, resulting in much lower volatilization of metals.

EP-509 134 B1 relates to a method for thermal processing of waste material contaminated with organic components, in particular metal scrap, comprising the following steps:

1) size reduction of the waste material to a maximum size of 5 cm;

2) pyrolysis at a temperature of from 550–600° C. with separation into pyrolysis gas and pyrolysis residue;

3) the pyrolysis residue is separated, in a mechanical processing apparatus, into metal scrap and pyrolysis coke, and 4) the pyrolysis coke, together with the pyrolysis gas, is gasified at a high temperature with the aid of an oxidant and possibly blast furnace coke to produce a fuel gas which is free from organic substances. The gasification is carried out at approximately 1600° C. The slags obtained in the gasification step can be used as a building material. However, in this method the two products from the pyrolysis step are gasified and smelted together, resulting in a less flexible process.

DE-4317806 C1 discloses a method for preparing fuel gas from gasifiable and combustible material, together with or without coal, metals and inert materials having been removed from said material. A gas and a residue are produced from the starting material, which has been ground to fine dust, with the exclusion of air or oxygen and using steam as a gasifying medium, said residue and said gas being used, in a smelting/gasification reactor operated at high temperature and with oxygen being supplied, to prepare a fuel gas and possibly slag which is suitable for road-building. The temperature in the smelting reactor is between 1400 and 2200° C., and the temperature in the gasifier is between 600 and 1000° C. The upstream, externally heated pyrolysis apparatus is operated at a temperature of from 300 to 600° C. This method, however, involves gasification using steam, which requires more energy.

EP-563 777 B1 describes a method for preparing synthesis gas via a thermal treatment of waste material which comprises metallic and organic components, in particular of packaging material comprising aluminium and plastic. Via pyrolysis, the waste material is decomposed into a pyrolysis gas and a pyrolysis residue, the pyrolysis residue then being gasified in oxygen-rich air or oxygen. This known method is characterized in that the pyrolysis is carried out at 300–500° C. until all the chlorine-containing substances have evaporated. The metal parts are then separated from the pyrolysis residue and the remaining residue is gasified at 1450 to 1850° C. under reducing conditions, the ash constituents being recovered as a vitrified slag. The pyrolysis gas, together with the gasifier gas, is converted into synthesis gas in a decomposition step, with the addition of steam, between 850 and 1250° C.

The literature reference DE 44 46 803 A1 relates to a method and apparatus for the thermal processing of a variety of types of waste material, wherein the waste material is subjected to a pyrolysis at a temperature of at most 800° C., advantageously 550–650° C.;

the solid residue liberated in the pyrolysis is reduced in size to a particle size of less than 1 mm;

the pyrolysis residue, reduced in size, possibly together with an introduced combustible liquid, is reacted autothermally, at a temperature which is above the melting temperature of the residue, with an oxygen-containing gas under a greatly elevated pressure of 2–40 bar to produce a $CO/H_2$-containing synthesis gas and a liquid slag;

the gas liberated during the pyrolysis is converted, with the aid of an oxygen-containing gas, into a $CO/H_2$-containing synthesis gas; and the two synthesis gases obtained are subjected, after pressure equalization, to gas cleaning.

Such a method has the drawbacks, however, that the pyrolysis residue, prior to being subjected to the gasification, first has to be reduced in size to a very small particle size of less than 1 mm, for example 0.5 mm, which entails an additional laborious size reduction stage;

the gasification stage of the pyrolysis residue which has been reduced in size has to be carried out under a greatly elevated pressure of 2–40 bar, which has repercussions regarding the provisions to be made in terms of equipment; and the liquid slag from the gasification stage of the pyrolysis residue, as, is apparent from the description of said DE 44 46 803 A1, solidifies to a vitrified product, a type of product which has no or hardly any possible applications.

Finally, EP-767 342 A1 describes a method for thermal processing of loose waste, which involves combustion of at least a portion of the combustible fraction of the waste and fusion of the incombustible solid fraction. This method is characterized in that, in the first stage, the waste, while in motion and being conveyed, is pyrolyzed with gases containing at least 40% oxygen, substoi-chiometric oxygen being introduced, with the formation of a pyrolysis gas and a pyrolysis residue. In a second stage, the pyrolysis residue, possibly together with the pyrolysis gas, is combusted with gas containing at least 40 per cent of oxygen, the amount of oxygen used being just what is required to cause the pyrolysis residue to melt. This known process, however, is carried out in an integrated apparatus in which the degrees of freedom for treating various feeds are considered very limited. Also, the total amount of combustible materials is combusted in situ, which has disadvantageous consequences for the energy efficiency of the method. Furthermore, the metals (scrap) are recovered as in iron alloy, and in the process the metal aluminium will be recovered in oxidized form, rather than as a metal.

To summarize, it emerges from the above-discussed prior art that the drawback of most known methods resides in the excessive interlinking of the process steps, whereas advantage derives precisely from allowing as many steps as possible to remain independent. This is because it is thus possible to take effective advantage of the great variation of feeds for a processing installation which must be able to process many types of waste and biomass material. Moreover, in a number of known methods the energy efficiency achieved is not optimal and the recovery of raw materials from the waste material has often not been stipulated as the main purpose.

The Applicant has therefore sought a method for processing waste and biomass material, which can be employed flexibly for various types of waste and biomass material;

is efficient in utilizing the available stored energy;

permits as much reuse as possible both of elemental metals (scrap) present in the waste material and—as far as possible—of metals and mineral materials present therein in other than elemental form; and causes minimal emissions, the inevitable emissions at the same time having to be harmless.

SUMMARY OF THE INVENTION

What we have found is a method which can be very widely used for processing various types of waste and biomass material, said method affording combustible gas, clean slags and metal (compounds) as valuable end products. More particularly, the invention relates to a method for processing waste or biomass material, which is characterized in that (a) the waste or biomass material is subjected to a pyrolysis at a temperature of 350–650° C., advantageously 450–550° C.;

(b) the gas released in the course of the pyrolysis is subjected—without condensation—to a cracking treatment at a temperature of 1100–1600° C., advantageously 1200–1400° C., under the influence of oxygen-rich gas introduced from outside and possibly of steam;

(c) the residue liberated in the course of the pyrolysis is gasified under a pressure of 0.5–1.5 bar, advantageously 0.8–1.2 bar, at a temperature of 1200–1700° C., advantageously 1400–1600° C., and is volatilized or, as the case may be, fused under reducing conditions;

(d) the fused slag or metal concentrate obtained under stage (c) is discharged or, as the case may be, recovered;

(e) the product gases obtained in the course of stages (b) and (c) are combined or not combined and then subjected to gas cleaning.

DETAILED DESCRIPTION OF THE INVENTION

In principle, any type of residue stream can be used in the method according to the invention. Examples of suitable feeds are waste, both purely inorganic or partly organic waste such as, for example, domestic and industrial waste, sewage sludge, sludges containing heavy metals ("ono sludges"), asbestos, fly ash, bottom ash from waste incineration plants (WIDs), residues from soil remediation or from cleaning by grit blasting, dust from steelmaking, residues from shredder operations, dredged mud, waste oil;

biomass, both waste, such as prunings and leaves, and grown biomass such as wood, plants, etc.; and fossil fuels, which may or may not be contaminated, or preferably the less valuable or the more highly contaminated types such as oil shale and low-grade bituminous coal.

It follows from the above that the feed for the method according to the invention need not meet any conditions, either regarding its composition or regarding its physical form. However, if necessary, the waste or, as the case may be, biomass material serving as feed is advantageously subjected to a size reduction or, as the case may be, drying treatment. More particularly, residue streams containing pieces larger than about 30 cm are reduced in size to a size of advantageously less than 15 cm, in particular less than 5 cm. Furthermore, advantageously, sludge-like and slurry-type residue streams having a high moisture content are dried using low-grade waste heat. After said drying, the material must be readily conveyable or, as the case may be, flowable, so that it can be passed in a simple manner to the pyrolysis apparatus or the gasifier/smelting apparatus. The moisture content at which said flowability requirement is met greatly depends, in this context, on the type of waste. For the sake of completeness, it should be noted in this context that the material to be fed in need not be completely dry.

Moreover, liquid, low-water and pumpable residue streams can be introduced directly into the pyrolysis reactor. Also, liquid residue streams to be processed in a burner can be introduced directly into the cracking facility. In addition, readily handled, i.e. fine-grained dry residue streams, can be introduced directly into the gasifier/smelting apparatus.

One embodiment of the method according to the invention can be illustrated with reference to the block diagram depicted in the figure.

The dried and pumpable feed (1), which may have been reduced in size in a facility (2), is pyrolyzed at a temperature of 350–650° C., advantageously about 450–500° C., in a pyrolysis apparatus (3). In the process, the combustible material decomposes into gas and coal. The ratio of the amount of gas formed to coal greatly depends on the type of feed, although the amount of coal is usually the smaller. Both the volume and the particle size of the solid treated material decrease considerably in the process. The pyrolysis residue obtained is fine-grained and can readily be conveyed and subjected to further processing. Pyrolysis is therefore highly suitable for converting non-homogeneous feeds having a variable composition into well-defined streams. These are then suitable as feeds for downstream process steps. The pyrolysis stage therefore has the function of a "thermal grinder" or of "feed preparers".

The temperature and residence time in the pyrolysis apparatus (3) are chosen so as to cause the volatile compounds to be separated wholly or in part from the introduced waste stream and to end up in the pyrolysis gas. Owing to the rotary motion of the pyrolysis drum which is normally used, a fine-grained pyrolysis residue remains, irrespective of whether the feed consisted of thick or thin pieces. The temperature in the pyrolysis drum is kept relatively low, so that caking, for example due to the softening of minerals, cannot take place.

The pyrolysis is normally carried out in a rotary drum or rotary kiln, which is heated internally and/or externally. In the process, the drum can be heated using product gas (via combustion) or other gases. For safety reasons, the pyrolysis system is normally operated under slight negative pressure. Leakage of air in this context reduces the gas quality and is prevented by effective seals.

As stated, the material in the pyrolysis apparatus has to be degassed. This not only affects the handleability of the pyrolysis residue, but also prevents toxic or carcinogenic organic compounds from remaining in the pyrolysis residue. To this end, the pyrolysis residue is passed out of the drum by means of a screw. The pores still hold pyrolysis gas, and when this is cooled, undesirable compounds can condense out onto the solid and may impart properties to the pyrolysis residue which are undesirable in terms of health and safety. The pyrolysis gas is therefore advantageously stripped with steam which is formed by water being injected into the discharge screw. In the process, the pyrolysis residue is then cooled to about 120° C. A second function of such a water injection carried out preferentially is to keep the partial water pressure sufficiently high, for soot not to form in the cracker.

Owing to the decomposition, obtained in the pyrolysis step, of the combustible materials, the fractions present in the feed, such as scrap and the like, are cleaned at this stage. These fractions can advantageously be separated in a simple manner from the pyrolysis residue with the aid of generally known techniques. Examples of these techniques are magnetic separation for iron and the eddy-current technique for non-ferrous metals (4).

The pyrolysis gas obtained in the pyrolysis step consists of a wide range of low—to high—boiling organic compounds. This pyrolysis gas is subjected without condensation—to a cracking treatment (5) at a temperature of advantageously 1200–1400° C. under the influence of oxygen-rich gas introduced from outside and possibly steam and in the process is cracked to mainly CO, $CO_2$, $H_2$ and $H_2O$. "Oxygen-rich" gas refers to air, to oxygen-enriched air and to oxygen itself, preferably air having an oxygen concentration of at least 90 vol %. The connection between the pyrolysis apparatus (3) and the cracking apparatus (5) is kept short and is heated in such a way that no condensation of higher-boiling compounds can occur. This manner of implementation relates to the aim of preventing any sources of blockage such as, for example, blockage based on polymerization. As well as the pyrolysis gas obtained, readily pumpable combustible liquids can also be coprocessed in this step. A pretreatment of such liquids in the pyrolysis step is unnecessary. The cracking apparatus (5) is advantageously operated at a temperature of 1100–1600° C., advantageously of about 1200–1400° C. The residence time in this apparatus is at least 1 second, so that the thermodynamic equilibrium is able to establish itself completely. The gas ultimately obtained now consists only of simple molecules, of which $H_2$ and CO are the main components. The gas obtained further contains a few per cent of $CO_2$ and $CH_4$. The sulphur, chlorine and nitrogen compounds present in the feed have been largely converted into $H_2S$, HCl and $N_2$. In addition, traces of COS, $NH_3$ and HCN may also be formed. The discharged gas is entirely free, however, from large-molecule impurities such as phenols and aromatics. To limit the amount of gas and to prevent dilution of the gas with nitrogen (from the air), the cracking apparatus (5) is operated with an oxygen-rich gas, preferably with oxygen. The gases obtained are then cooled by injection of water or steam. This causes the hydrogen content of the gas to rise as a result of the water/gas equilibrium being shifted. The fact is that the ratio CO to $H_2$ in the synthesis gas can be adjusted within certain limits by varying the amount of water or steam.

The residue obtained in the pyrolysis step and other possible fine-grained external residue streams, it being possible for said external soild feed streams advantageously to have a particle size of 0.5–5 cm, are smelted in a gasifier/smelting reactor (6). Said reactor (6) is preferably a reactor known front pyrometallurgy. The requirement regarding particle size in this case is less strict and may be 5 cm or less. Said gasifier/smelting reactor (6) is operated at a temperature of 1200–1700° C., advantageously 1400–1600° C., under reducing conditions. The processed pyrolysis residue serves as a fuel in the process, possibly supplemented with another fuel such as combustible waste liquid, oil or gas. This fuel is gasified with air, oxygen-enriched air or oxygen itself, preferably gas with a high oxygen content comprising at least 90 vol % of $O_2$. Many thermodynamic equilibrium stages are established in the smelting reactor (6). Under the reducing conditions ($pO_2 << 10^{-2}$ bar, advantageously $<10^{-5}$ bar, preferably about $10^{-9}$ to $10^{-10}$ bar) prevailing in the smelting reactor (6), a number of metals is reduced and the minerals form a slag bed. Some of the metals, such as zinc, lead, tin, arsenic, antimony, cadmium and silver, volatilize. Under these conditions, compounds of copper, cobalt and nickel are likewise reduced to a great extent and will separate as a metal phase or metal sulphide phase. If the feed is very iron-rich, the partial oxygen pressure can advantageously be further decreased, so that the greater portion of the iron compounds are likewise reduced and form a separate iron phase. Depending on the conditions and the composition of the feed, a portion of the manganese, vanadium and chromium present, for example, will dissolve in it after reduction. The oxygen pressure required to form an iron phase depends on the precise slag composition and can be achieved if solid coal is present in the slag. A major fraction of the metals is thus separated from the mineral material. The residual fraction of the metals is incorporated as a cation in the mineral lattice. In order for it to be possible to operate the smelting reactor (6) effectively, the slag should retain a low viscosity and melt completely at the operating temperature. The viscosity of the slag should, for example, be less than 25 Pa.s, advantageously less than 10 Pa.s, in order to ensure both good separation between slag phase and metal phase and good tappability. The fact is that blockages may occur if the slag to be tapped off becomes too viscous or if solid deposits form in the furnace. Too low a slag viscosity should also be prevented in connection with erosion of the refractory furnace lining. More particularly, the smelting reactor (6) should be operated at a temperature of at least 50° C. above the liquidus temperature (the temperature at which all the slag has melted), so that there is no risk of the slag bath freezing. In so doing, the slag viscosity at this temperature can be adjusted to the desired value via the adjustment of the composition of the feed.

It is also postulated that the composition of the slag determines its crystallization behaviour. If the slag crystallizes with difficulty, a completely vitreous slag can be expected upon cooling. A crystalline structure is desired, however, with a view to binding the metals still present in the slag as well as with a view to the mechanical characteristics thereof. It is also possible to adjust the slag properties by employing mineral additives such as sand and lime. Such additives can be added to the gasifier/smelting reactor (6) via a mixing section, in order to obtain the correct mineral composition of the slag. More particularly, adjusting the atomic composition is essential for the mechanical characteristics of the slag. Depending on the marketing options it is possible to opt for shaped products or unshaped stone. Also, the production can aim for a composition which offers marketing opportunities in the cement industry.

In summary, it is asserted that, by means of the gasifier/smelting reactor (6), highly effective separation of volatile and liquid metals is ensured, so that the slag ultimately obtained meets the stringent leaching requirements laid down for unrestricted use.

In a subsequent stage, the product gas from the smelting reactor (6) is combined with the product gas from the cracking apparatus (5) and then cooled. In the cooling section, finely dispersed metal oxides form from the volatile metal vapour. The gas cleaning (7) may be composed of a number of stages. Many embodiments are possible for this purpose. For example, the acidic gases, such as HCl, could first be scrubbed out with sodium hydroxide solution. In this context the scrubbing facility is operated in such a way that the water in the gas does not condense. Then the gas is reheated and the metal oxides can be recovered in a cloth filter. Then the gas is cooled and the water condenses. Finally, the hydrogen sulphide can be removed by means of, for example, absorption, and mercury and any residual organic substances can be recovered with the aid of, for example, activated carbon. In a compressor, the gas can be brought to the desired delivery pressure after or during gas cleaning.

On the other hand, the two product gases from the cracking apparatus (5) and the gasifier/smelting reactor (6), respectively, can also be subjected separately to gas cleaning.

The product gas obtained above, or the cleaned product gases obtained, respectively, can either be used directly, for example for generating energy, or can additionally be subjected to a CO shift or PSA (pressure swing adsorption) stage (8) or a VPSA (vacuum pressure swing adsorption) stage, the synthesis gas in question being converted into hydrogen which can be used for a variety of purposes.

Regarding the apparatus required for implementing the method according to the invention it is suggested that this can be configured using (pieces of) equipment known per se from the prior art.

Advantages of the method according to the invention

Optimal flexibility is considered to be the most important advantage of the method according to the invention, since it is possible for suitable waste/biomass streams to be fed in at various points of the apparatus, such as, for example, moist material to the drier, liquid and combustible material to the cracker and inorganic waste to the gasifier+smelter;

it is possible for the pyrolysis to be carried out at a location other than the gasifier+smelter, as the pyrolysis gas is cracked separately and is consequently readily usable and the—much smaller—amount of pyrolysis residue is easily conveyed elsewhere; and in the case of an apparatus which has to be suitable for many different feeds, intermediate storage in between the steps will be employed in order to increase the flexibility yet further. Obviously this will be necessary to a lesser extent or not at all for an apparatus using a fixed, defined feed, which does not fluctuate over time.

Wishes regarding efficiency are satisfied by synthesis gas being made from the organic constituents of the feed and the integrated use of low-level waste heat such as, for example, from the boiler in the case of cooling of the synthesis gas after the gasifier+smelter in the drier. Since residual heat can, to a large extent, be utilized internally, the efficiency of the present invention is much less location-dependent than other, known processes.

The recovery of raw materials is [lacuna] with the separation of scrap from the pyrolysis residue, the smelting of the mineral constituents to a slag composition having desired characteristics, so that it can be used as a construction material, cement raw material and the like;

the generation of a reusable flue dust containing heavy metals in the gasifier+smelter step because the latter is operated under reducing conditions, which contains by far the greatest proportion of, for example, the zinc and lead present; and the possible generation of a separate iron phase in which other metals may also be present by adjustment of the reducing conditions. This is done only if occasioned by the composition of the feed.

With the present method, emissions are minimal and can be removed at relatively low cost, since the gas volumes are small owing to the use of technical-grade oxygen in the cracker steps and gasifier+smelter steps. The sulphur present in the feed is liberated in the process as hydrogen sulphide (because of operation under reducing conditions) and can be converted in a simple manner to saleable elemental sulphur. The halogens are converted as acids into salts which, after evaporation, can be used, for example, as road salt. Depending on the amount present in the feed, the mercury is converted into saleable metallic mercury or captured on activated carbon.

PCDD/PCDFs (dioxins and furans) and other halogenated compounds are broken down completely at the high temperatures used with the present method. Moeover, the presence of hydrogen ensures simultaneous, very rapid hydrogenolysis of these compounds, should they still be present. The absence of oxygen in the product gas also means that no halogenated compounds are formed upon cooling.

Likewise, the sticking points that normally occur during combustion, such as the maximum temperature on the combustion grate being exceeded;

limited capacity owing to an unduly high calorific value or poor combustion behaviour; and incomplete combustion or varying piece size and lack of homogeneity will not or virtually not occur with the method according to the present invention.

It is also pointed out that the temperature and the residence time in the cracker (5) and the gasifier/smelting reactor (6) are such that virtually complete establishment of the thermodynamic equilibrium stages is possible. The process result therefore depends solely on the atomic composition of the input or feed, which means that the form in which the residue streams are introduced into the apparatus according to the invention is of no importance. Carbon atoms and hydrogen atoms in plastic or wood yield the same gas quality as carbon atoms and hydrogen atoms in hazardous waste. This also applies to contaminated materials. Chlorine atoms from, for example, dioxin are converted into hydrochloric acid, and ultimately cooking salt, just as quantitatively as chlorine atoms in plastic. The same can be said for heavy metals and minerals. Whatever the form of the compound in which they are introduced as a feed, the ultimate composition of the slag and the metal concentrate does not change.

The quality of the products according to the present invention is therefore determined, inter alia, by, on the one hand, the position of the thermodynamic equilibria and, on the other hand, the atomic composition of the input. Since heavy organic impurities are broken down in the cracking or gasification stage, the gas can be processed to a high quality. If the gas is burnt, the burner must, however, be suitable for the gas composition.

Comparison of the present method with a number of known methods

A comparison between some commercial processes, including the widely used waste incineration plant (WIP), and the method according to the present invention is given below.

1. Comparison in Terms of Energy

A comparison in terms of energy, specifically between electrical efficiency in the WIP, the "SchwelBrenn Verfahren" (EP 302310 B1) and Noell (EP 545241 A1) and Thermoselect (EP 443596 B2) (if the synthesis gas is burnt in a gas engine and after subtraction of the amount which is used in the process itself) and the present method (=PEC), respectively, is shown in the table below. This has been drawn up on the basis of the literature references (except for the PEC; this is the present method; see A. E. Pfeiffer et al., "Vergelijkende studie thermische verwerking van huishoudelijk afval. Een evaluatie van vijf technieken" [Comparative study of thermal processing of domestic waste. An evaluation of five techniques], VVAV, Utrecht, Aug. 1, 1995). A range is specified, the lowest number now having been achieved and the higher number possibly being attainable if improvements are made.

| Process | Efficiency, electrical, net, % | Comments |
|---|---|---|
| WIP | 20–22 | if wastes (which are now being dumped or used under special conditions) are smelted, this drops to about 15% |
| SchwelBrenn Verfahren | 15–21 | |
| Noell | 19–30 | higher efficiency if a syngas cooler is used instead of rapid cooling of gasifier gas |
| Thermoselect | 12 | |
| PEC | 30–40 | depending on the type of waste and method of energy generation, when higher-temperature fuel cells become operational, up to 60% can be achieved |

Obviously, all the processes produce waste heat which, depending on the local conditions, can also be utilized.

2. Broader Comparison Between WIP and PEC

A broader comparison has also been made between the WIP and the PEC, using, for example, shredder waste (composition: C:36; H:4.5; O:11; N:2; ash:40; Cu:0.5; Zn:0.8; dry substance:94 (all in % m/m)) as a feed. At the same time, the energy efficiency and the emissions were compared for a Dutch situation.

Per tonne of shredder waste the differences between two processes are as follows:

| | | Improvement of PEC with respect to WIP | |
|---|---|---|---|
| Aspect | Unit | absolute | as % of the WIP figures |
| primary energy | GJ | 8 | 70 |
| climate change | kg $CO_2$ eq | 524 | 114 |
| acidification | kg $SO_2$ eq | 5.6 | 175 |
| eutrophication | kg $PO_4$ eq | 0.84 | 115 |
| waste to be dumped | kg | 42 | 108 |

In terms of human toxicity and eco-toxicity parameters, the PEC scores positively with respect to WIP.

Translation of diagram

1. Feed
2. Feed preparation
   heat
3. Pyrolysis
   heat
   residue
   gas
4. Separation of ferrous and non-ferrous
   andere voeding=other feed
5. Cracking
   oxygen
   steam
6. Gasification/fusing
   zuurstof=oxygen
   metaalconcentraat=metal concentrate
   basalt, cement(grondstof)=basalt, cement (base material)
7. Gas cleaning
   salt
   sulphur
   synthesegas=synthesis gas 8. CO shift and PSA (possibly)
waterstof=hydrogen
Application:chemistry,
Application:chemistry,
energy generation
energy (fuel cell)

What is claimed is:

1. Method for processing waste or biomass material, characterized in that
   (a) the waste or biomass material is subjected to a pyrolysis at a temperature of 350–650° C., advantageously 450–550° C.;
   (b) the gas released in the course of the pyrolysis is subjected—without condensation—to a cracking treatment at a temperature of 1100–1600° C., advantageously 1200–1400° C., under the influence of oxygen-rich gas introduced from outside and possibly of steam;
   (c) the residue liberated in the course of the pyrolysis is gasified under a pressure of 0.5–1.5 bar, advantageously 0.8–1.2 bar, at a temperature of 1200–1700° C., advantageously 1400–1600° C., and is volatilized or, as the case may be, fused under reducing conditions;
   (d) the fused slag or metal concentrate obtained under stage (c) is discharged or, as the case may be, recovered;
   (e) the product gases obtained in the course of stages (b) and (c) are combined or not combined and then subjected to gas cleaning.

2. Method according to claim 1, characterized in that the waste or, as the case may be, biomass material to be used as a feed is beforehand subjected to a size reduction or, as the case may be, drying treatment.

3. Method according to claim 2, characterized in that the waste or biomass material is reduced in size to a particle size of <30 cm, advantageously <15 cm and advantageously <5 cm.

4. Method according to claim 1, wherein the cracking treatment carried out in stage (b) additionally involves the introduction of liquid or, as the case may be, solid combustible waste.

5. Method according to claim 1, wherein the hot residue derived from the pyrolysis process is stripped using steam by means of water being injected.

6. Method according to claim 1, wherein the residue derived from the pyrolysis process is stripped of metal parts before the residue is subjected to stage (c).

7. Method according to claim 6, characterized in that the removal of iron is carried out with the aid of magnetic separation techniques and the removal of non-ferrous metals is carried out with the aid of eddy-current techniques.

8. Method according to claim 1, wherein stage (c) is carried out with the introduction of an oxygen-rich gas for the purpose of gasifying and combusting the coal present in the pyrolysis residue or the optionally introduced combustible liquid.

9. Method according to claim 1 in stage (c) external solid material is fed in in addition to the pyrolysis residue.

10. Method according to claim 1, wherein the external solid feed for stage (c) has a particle size of 0.5–5 cm.

11. Method according to claim 1, wherein stage (c) is carried out in the presence of solid carbon with the formation of a separate liquid, mainly ferriferous, metal phase.

12. Method according to claim 1, wherein stage (c) involves the addition of mineral additives in order to adjust the slag properties.

13. Method according to claim 12, characterized in that the mineral additives added are sand and/or lime.

14. Method according to claim 1, wherein the gas cleaning is carried out by successively
   scrubbing out acidic gases such as HCl using an alkali, the water in the gas not condensing in the process;
   recovering the metal oxides;
   cooling the gas, the water condensing in the process;
   removing hydrogen sulphide by means of absorption; and
   removing mercury by means of absorption on activated carbon.

15. Method according to claim 14, characterized in that the cleaned gas is subjected to a CO shift and possibly a PSA or VPSA.

* * * * *